US012789797B2

(12) United States Patent
Flehmig

(10) Patent No.: US 12,789,797 B2
(45) **Date of Patent: *Nov. 10, 2026**

(54) METHOD FOR THE AT LEAST PARTLY AUTOMATED GUIDANCE OF A MOTOR VEHICLE

(71) Applicant: Robert Bosch GmbH, Stuttgart (DE)

(72) Inventor: Folko Flehmig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

This patent is subject to a terminal disclaimer.

(21) Appl. No.: 18/709,253

(22) PCT Filed: Nov. 7, 2022

(86) PCT No.: PCT/EP2022/080896
§ 371 (c)(1),
(2) Date: May 10, 2024

(87) PCT Pub. No.: WO2023/083722
PCT Pub. Date: May 19, 2023

(65) Prior Publication Data

US 2025/0002010 A1 Jan. 2, 2025

(30) Foreign Application Priority Data

Nov. 11, 2021 (DE) ..................... 10 2021 212 681.2

(51) Int. Cl.
*B60W 30/095* (2012.01)
*B60W 50/00* (2006.01)

(52) U.S. Cl.
CPC ...... *B60W 30/095* (2013.01); *B60W 50/0097* (2013.01); *B60W 50/0098* (2013.01); *B60W 2556/45* (2020.02)

(58) Field of Classification Search
CPC ........... B60W 30/095; B60W 50/0097; B60W 50/0098; B60W 2556/45;
(Continued)

(56) References Cited

U.S. PATENT DOCUMENTS

| | | | | |
|---|---|---|---|---|
| 11,731,617 B2 * | 8/2023 | Shalev-Shwartz .... | B60W 30/09 701/41 |
| 2003/0171865 A1 * | 9/2003 | Moser ................... | B60W 50/00 701/1 |

(Continued)

FOREIGN PATENT DOCUMENTS

| | | |
|---|---|---|
| DE | 10 2012 222 562 A1 | 6/2014 |
| DE | 10 2018 127 270 A1 | 4/2020 |
| DE | 10 2020 208 293 A1 | 1/2022 |

OTHER PUBLICATIONS

International Search Report corresponding to PCT Application No. PCT/EP2022/080896, mailed Feb. 27, 2023. (German and English language document). (6 pages).

*Primary Examiner* — Sihar A Karwan
(74) *Attorney, Agent, or Firm* — Maginot, Moore & Beck LLP

(57) ABSTRACT

A method for the at least partly automated guidance of a motor vehicle includes (i) receiving desired control signals which are representative of a desired control for an actuator system of the motor vehicle in order to control a transverse and/or longitudinal guidance of the motor vehicle, (ii) receiving surroundings signals which are representative of a surroundings of the motor vehicle, (iii) generating control signals for the at least partly automated control of a transverse and/or longitudinal guidance of the motor vehicle based on the desired control signals, the surroundings signals and a predefined limitation of the desired control, and (iv) outputting the generated control signals. A device,
(Continued)

system, computer program and machine-readable storage medium relating to the above method is also disclosed.

14 Claims, 4 Drawing Sheets

(58) Field of Classification Search
CPC ......... B60W 2050/0006; B60W 30/09; B60W 30/0953; B60W 30/0956; B60W 50/087; B60W 60/0013; B60W 60/0015
See application file for complete search history.

(56) References Cited

U.S. PATENT DOCUMENTS

| | | | | |
|---|---|---|---|---|
| 2010/0228419 | A1* | 9/2010 | Lee | G05D 1/0246 701/25 |
| 2019/0196471 | A1* | 6/2019 | Vaughn | G05D 1/0221 |
| 2019/0258251 | A1* | 8/2019 | Ditty | B60W 60/0015 |
| 2019/0382003 | A1* | 12/2019 | Jiang | B60W 30/09 |
| 2020/0065978 | A1* | 2/2020 | Jales Costa | G06V 10/435 |
| 2020/0135016 | A1* | 4/2020 | Julian | G08G 1/0129 |
| 2020/0339112 | A1* | 10/2020 | Rosenzweig | B60W 30/0953 |
| 2021/0192234 | A1* | 6/2021 | Chen | G06V 20/58 |
| 2022/0126864 | A1* | 4/2022 | Moustafa | B60W 60/0013 |
| 2022/0244736 | A1* | 8/2022 | Konrardy | G05D 1/617 |
| 2023/0095384 | A1* | 3/2023 | Sharma Banjade | G08G 1/096725 701/301 |
| 2024/0092357 | A1* | 3/2024 | Kobilarov | B60W 30/0956 |
| 2025/0002010 | A1* | 1/2025 | Flehmig | B60W 50/0097 |
| 2025/0153725 | A1* | 5/2025 | Wulf | B60W 30/02 |
| 2025/0206349 | A1* | 6/2025 | Cheng | B60W 30/18145 |

* cited by examiner

METHOD FOR THE AT LEAST PARTLY AUTOMATED GUIDANCE OF A MOTOR VEHICLE

This application is a 35 U.S.C. § 371 National Stage Application of PCT/EP2022/080896, filed on Nov. 7, 2022, which claims the benefit of priority to Serial No. DE 10 2021 212 681.2, filed on Nov. 11, 2021 in Germany, the disclosures of which are incorporated herein by reference in their entirety.

The disclosure relates to a method for the at least partly automated guidance of a motor vehicle, a device, a system for the at least partly automated guidance of a motor vehicle, a computer program, and a machine-readable storage medium.

BACKGROUND

Patent application DE 10 2012 222 562 A1 discloses a system for managed parking areas for transferring a vehicle from a start position to a target position.

Highly automated or fully automated guidance places particularly high demands on the safety of at least partly automated vehicles. At the same time, equally high demands are placed on functional performance, e.g. a user experience, especially when people are intended to be transported.

For the development of an at least partly automated vehicle, it can be advantageous to separate the domains of performance and safety so that the optimum development methods and algorithms can be used for each. High functional performance is, e.g., quickly achieved through the use of deep neural networks, which often means greater effort when it comes to security.

SUMMARY

The object underlying the disclosure is to provide a concept for the efficient and at least partly automated guidance of a motor vehicle.

This object is achieved by the respective subject matter set forth herein. Advantageous embodiments of the disclosure are the subject matter also set forth herein.

Provided according to a first aspect is a method for at least partly automated guidance of a motor vehicle, comprising the following steps:

- receiving desired control signals which are representative of a desired control for an actuator system of the motor vehicle in order to control a transverse and/or longitudinal guidance of the motor vehicle;
- receiving surroundings signals which are representative of surroundings of the motor vehicle; generating control signals for the at least partly automated control of a transverse and/or longitudinal guidance of the motor vehicle based on the desired control signals, the surroundings signals and a predefined limitation of the desired control;
- outputting the generated control signals.

Provided according to a second aspect is a device which is configured to perform all of the method steps according to the first aspect.

Provided according to a third aspect is a system for the at least partly automated guidance of a motor vehicle, said system comprising:

- the device according to the second aspect and
- an actuator system unit, in particular a plurality of actuator system units, for an actuator system of the motor vehicle, the actuator system unit being configured to limit the desired control and to control one or more actuators of the actuator system based on the limited desired control,
- the actuator system unit being configured to control the one or more actuators of the actuator system based on the control signals and no longer based on the limited desired control upon receipt of control signals output by the device.

Provided according to a fourth aspect is a computer program comprising instructions which, when the computer program is executed by a computer, e.g. the device according to the second aspect and/or the system according to the third aspect, prompt said computer to perform a method according to the first aspect.

Provided according to a fifth aspect is a machine-readable storage medium, on which the computer program according to the fourth aspect is stored.

The disclosure is based on and includes the realization that a desired control to an actuator system can be safeguarded by generating and outputting control signals for at least partly automated control of a transverse and/or longitudinal guidance of the motor vehicle, which override the desired control, depending on the specific desired control, the surroundings of the motor vehicle and a predefined limitation of the desired control performed by an actuator system unit.

In other words, based on the desired control signals, the surroundings signals and the predefined limitation of the desired control, it is determined whether the desired control needs to be safeguarded. If the determination has shown that the desired control must be safeguarded, then the control signals for at least partly automated control of transverse and/or longitudinal guidance of the motor vehicle are generated and output so that the desired control is overridden.

If the determination has shown that the desired control does not need to be safeguarded, then no control signals are generated for at least partly automated control of transverse and/or longitudinal guidance of the motor vehicle, so that the desired control is not overridden, but rather performed.

On the one hand, it is therefore intended that a desired control is limited, in particular by an actuator system unit, in order to ensure safe driving operation in an advantageous manner. This means, for example, that only minor longitudinal deceleration and small steering angle changes are permitted. Before the limited desired control is performed, it is arbitrated with a result of the aforementioned determination, whereby the desired control is always overridden by the control signals if the determination has shown that the desired control must be safeguarded.

This means, for example, that primary motion planning is provided, which generates and outputs the desired control. This primary motion planning is, e.g., safeguarded by secondary motion planning, which uses the knowledge that the desired control of the primary motion planning is limited before it is performed by an actuator system of the motor vehicle to check whether the limited desired control will lead to an unsafe and/or dangerous situation when performed. If this is the case, the limited desired control is overridden by generating and outputting corresponding control signals.

If, for example, the desired control is limited for reasons of comfort, but this in turn would lead to a collision with an object in the surroundings of the vehicle, this is recognized by the secondary motion planning, which has knowledge of this limitation. Without this knowledge, the secondary motion planning would possibly come to the conclusion that the desired control would not lead to a collision. However, since the secondary motion planning knows that the desired control is limited by the actuator systems before being performed, it can take this into account when checking the desired control.

This means that, on the one hand, a motor vehicle can be guided comfortably for one person, at least partly automatically, due to the limitation. On the other hand, however, it is advantageously ensured that this gain in comfort does not lead to a dangerous situation, insofar as the limited desired control is checked to see whether performing of the limited desired control by the actuator system leads, for example, to a collision with an object in the surroundings of the motor vehicle or to another dangerous situation.

Thus, in particular, the technical advantage is that a desired control for controlling the transverse and/or longitudinal guidance of a motor vehicle can be efficiently secured, which in turn has the technical advantage that the motor vehicle can be efficiently guided at least partly automatically.

In one embodiment, multiple actuator system units are provided for one or more actuator systems. Statements made in connection with one actuator system unit apply in a similar manner to multiple actuator system units, and vice versa.

The phrase "at least partly automated guidance" comprises one or more of the following cases: assisted guidance, partly automated guidance, highly automated guidance, fully automated guidance. The phrase "at least partly automated" thus comprises one or more of the following phrases: assisted, partly automated, highly automated, fully automated.

The term "assisted guidance" means that a driver of the motor vehicle continuously performs either the transverse or the longitudinal guidance of the motor vehicle. The respective other driving task (i.e., controlling the longitudinal or transverse guidance of the motor vehicle) is performed automatically. In other words, either the transverse or the longitudinal guidance is controlled automatically when the motor vehicle is guided in an assisted manner.

partly automated guidance means that in a specific situation (for example: driving on a freeway, driving in a parking lot, passing an object, driving within a travel lane defined by lane markings) and/or for a certain period of time, a longitudinal and a transverse guidance of the motor vehicle are controlled automatically. The driver of the motor vehicle need not manually control the longitudinal and transverse guidance of the motor vehicle. However, the driver has to continually monitor the automatic control of the longitudinal and transverse guidance in order to be able to intervene manually when necessary. The driver has to be ready to take over complete guidance of the motor vehicle at all times.

Highly automated guidance means that for a certain period of time in a specific situation (for example: driving on a freeway, driving in a parking lot, passing an object, driving within a travel lane defined by lane markings) a longitudinal and a transverse guidance of the motor vehicle are controlled automatically. The driver of the motor vehicle need not manually control the longitudinal and transverse guidance of the motor vehicle. The driver does not have to continuously monitor the automatic control of the longitudinal and transverse guidance in order to be able to intervene manually when necessary. If necessary, a take-over request is automatically output to the driver to take over control of the longitudinal and transverse guidance, in particular output with adequate time to respond. The driver therefore has to potentially be able to take control of the longitudinal and transverse guidance. Limits of the automatic control of the transverse and longitudinal guidance are recognized automatically. In highly automated guidance, it is not possible to automatically bring about a minimal risk state in every initial situation.

Fully automated guidance means that, in a specific situation (for example: driving on a freeway, driving in a parking lot, passing an object, driving within a travel lane defined by lane markings), longitudinal guidance and transverse guidance of the motor vehicle are controlled automatically. The driver of the motor vehicle need not manually control the longitudinal and transverse guidance of the motor vehicle. The driver does not have to monitor the automatic control of the longitudinal and transverse guidance in order to be able to intervene manually when necessary. Before the automatic control of the transverse and longitudinal guidance is ended, the driver is automatically prompted to take over the driving task (control of the transverse and longitudinal guidance of the motor vehicle), in particular with adequate time to respond. If the driver does not take over the driving task, the system automatically returns to a minimal risk state. Limits of the automatic control of the transverse and longitudinal guidance are recognized automatically. In all situations, it is possible to automatically return to a minimal risk system state.

The features of the embodiments and exemplary embodiments described herein can be combined with each other in any combination, even if this is not explicitly described.

In one embodiment, it is provided that a state of the motor vehicle is predicted based on the desired control signals and the limitation of the desired control, whereby the control signals are generated based on the predicted state.

The technical advantage thereby is, e.g., that the control signals can be generated efficiently.

According to one embodiment, the surroundings of the motor vehicle is predicted, whereby the control signals are generated based on the predicted surroundings.

The technical advantage thereby is, e.g., that the control signals can be generated efficiently.

According to one embodiment, it is provided that the predicted state of the motor vehicle is evaluated in the context of the predicted surroundings, whereby the control signals are generated based on the evaluated, predicted state.

The technical advantage thereby is, e.g., that the control signals can be generated efficiently.

According to one embodiment, it is provided that the control signals are only generated when a predicted state is evaluated as unsafe.

The technical advantage thereby is, e.g., that the control signals can be generated efficiently.

According to one embodiment, it is provided that the desired control comprises a desired manipulated variable vector for one or more actuators of the actuator system, whereby the limitation comprises a limitation of the desired manipulated variable vector and/or a limitation of a temporal derivative, in particular the first and/or the second temporal derivative, of the desired manipulated variable vector.

The technical advantage thereby is, e.g., that the desired control can be represented by particularly suitable desired control parameters (the manipulated variable vector). The technical advantage thereby is in particular that, e.g., particularly suitable limits are selected with regard to comfort for a passenger of the motor vehicle.

According to one embodiment, it is provided that the desired control comprises one or more elements selected from the following group of desired controls: desired control of a driver of the motor vehicle, desired control of an algorithm for at least partly automated guidance of the motor vehicle, and desired control of teleoperation software for implementing control instructions of a teleoperator of the motor vehicle.

The technical advantage thereby is, e.g., that a large number of different control requirements can be safeguarded.

Device features and/or system features result in a similar manner from corresponding method features, and vice versa.

This means in particular that technical functionalities of the method result from corresponding technical functionalities of the device and/or the system, and vice versa.

For the purposes of this description, a condition of the motor vehicle generally comprises, for example, the following: position, and/or speed, and/or deceleration, and/or acceleration.

In one embodiment, the method according to the first aspect is a computer-implemented method.

BRIEF DESCRIPTION OF THE DRAWINGS

Exemplary embodiments of the disclosure are shown in the drawings and explained in more detail in the subsequent description. Shown are.

The same reference signs may be used for the same features hereinafter.

DETAILED DESCRIPTION

Figure 1:
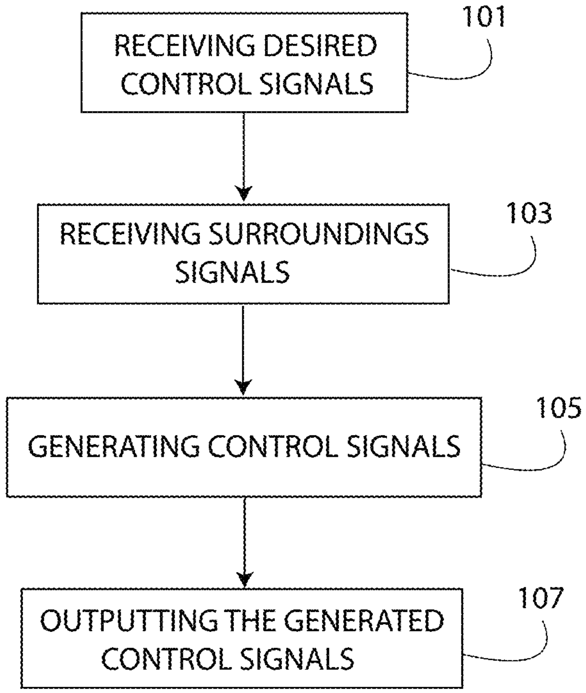
FIG. 1 a flow chart of a method for at least partly automated guidance of a motor vehicle, FIG. 2 a device, FIG. 3 a system for at least partly automated guidance of a motor vehicle, FIG. 4 a machine-readable storage medium and FIGS. 5 to 7 a block diagram in each case.

FIG. 1 shows a sequence of a method for at least partly automated guidance of a motor vehicle, comprising the following steps:

- receiving 101 desired control signals which are representative of a desired control for an actuator system of the motor vehicle in order to control a transverse and/or longitudinal guidance of the motor vehicle;
- receiving 103 surroundings signals which are representative of surroundings of the motor vehicle,
- generating 105 control signals for the at least partly automated control of a transverse and/or longitudinal guidance of the motor vehicle based on the desired control signals, the surroundings signals and a predefined limitation of the desired control;
- outputting 107 the generated control signals.

In one embodiment, the method according to the first aspect comprises a step of at least semi-automated control of a transverse and/or longitudinal guidance of the motor vehicle based on the generated control signals or based on the limited desired control. In one embodiment, the method according to the first aspect comprises a step of overriding the desired control by the output control signals.

Figure 2:

FIG. 2 shows a device 201, which is configured to perform all of the method steps according to the first aspect.

Figure 3:
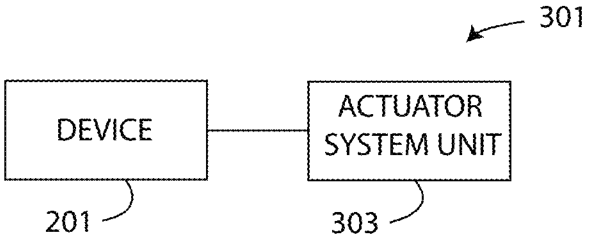

FIG. 3 shows a system 301 for the at least partly automated guidance of a motor vehicle, said system comprising:

- the device 201 according to claim 2 and
- an actuator system unit 303, in particular a plurality of actuator system units (not shown) for an actuator system of the motor vehicle, the actuator system unit 303 being configured to limit the desired control and to control one or more actuators of the actuator system based on the limited desired control,
- whereby the actuator system unit 303 is configured to, upon receiving control signals output by the device, control the one or more actuators of the actuator system based on the control signals and no longer based on the limited desired control.

Figure 4:
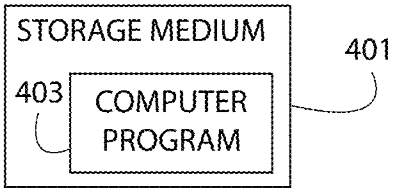

FIG. 4 shows a machine-readable storage medium 401 on which a computer program 403 is stored. The computer program 403 comprises instructions that, when the computer program 403 is executed by a computer, prompt the latter to perform a method according to the first aspect.

Figure 5:
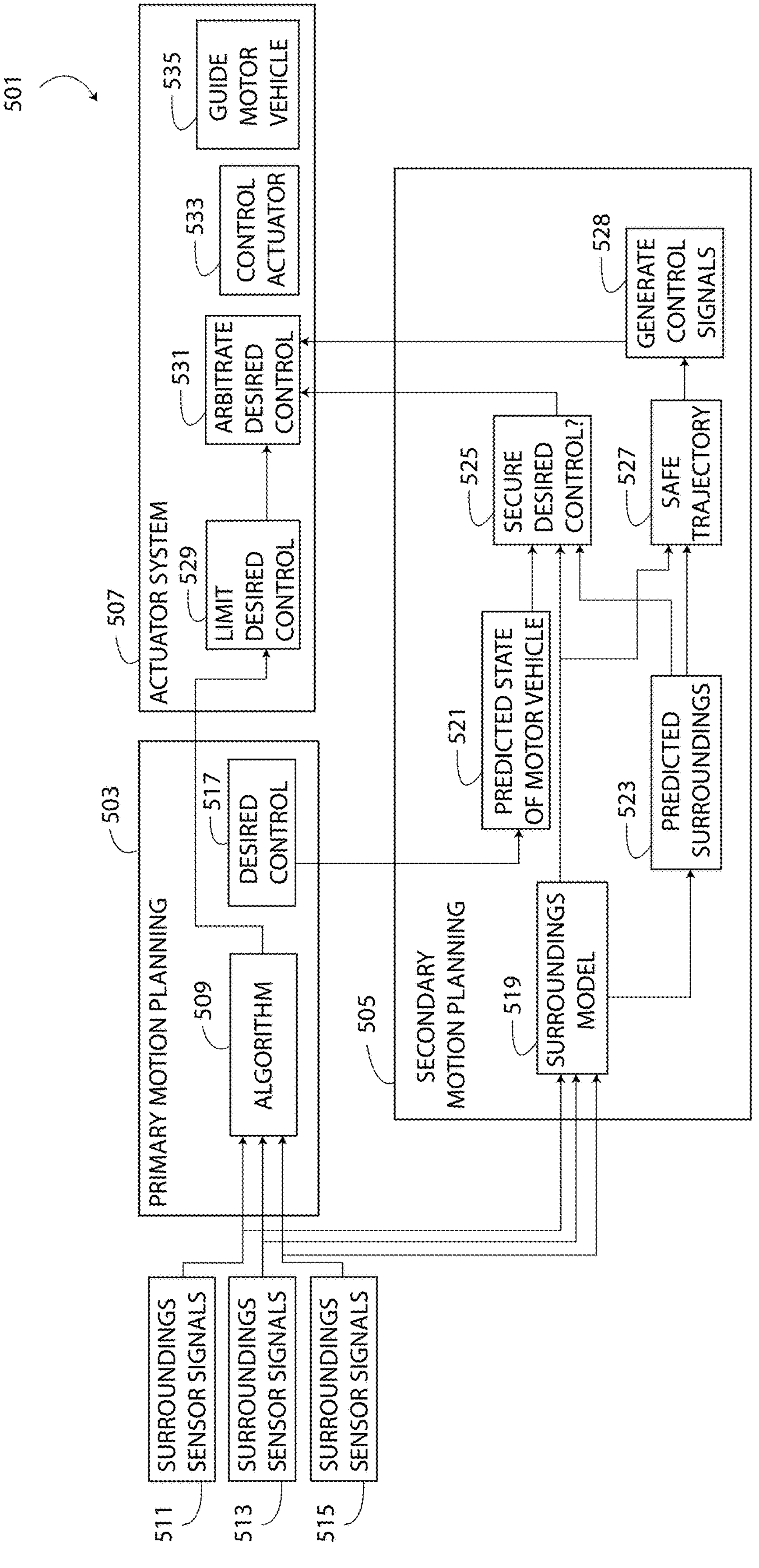

FIG. 5 shows a first block diagram 501, which is intended to explain the concept described in this case by way of example.

According to the first block diagram 501, a primary motion planning 503 is provided, a secondary motion planning 505, and an actuator system 507 of a motor vehicle. The secondary motion planning 505 is configured to safeguard the primary motion planning 503. In this respect, the secondary motion planning 505 can also be referred to as a safety level or safety motion planning.

An algorithm 509 is provided on the primary motion planning side 503, this being an algorithm for at least partly automated guidance of a motor vehicle. This means, for example, that this algorithm receives or receives surroundings signals as input data, which represent surroundings of the vehicle. Exemplary surroundings signals comprise, for example, surroundings sensor signals 511 of a first surroundings sensor of the motor vehicle and second surroundings sensor signals 513 of a second surroundings sensor of the motor vehicle. These surroundings sensor signals are based on the respective detection of an surroundings of the vehicle by means of the surroundings sensors. Surroundings signals comprise, for example, digital map signals 515, which represent a digital map of the vehicle's surroundings.

The two surroundings signals 511, 513 and the digital map signals 515 are thus examples of surroundings signals which represent a surroundings of the motor vehicle. In embodiments (not shown), provision may, e.g., be made for further surroundings sensor signals from further surroundings sensors of the motor vehicle and/or from infrastructure surroundings sensors which are spatially distributed within an infrastructure through which the motor vehicle is currently traveling.

These surroundings signals are thus provided to the algorithm 509, which generates and outputs a desired control 517 to an actuator system of the motor vehicle for controlling transverse and/or longitudinal guidance of the motor vehicle based on them.

It is provided that the secondary motion planning 505 also accepts or receives surroundings signals, whereby these surroundings signals may be the same surroundings signals that the primary motion planning 503 receives. This is shown by way of example in the block diagram 501 in FIG. 5. In embodiments (not shown), it may be provided that the secondary motion planning 505 receives more or fewer surroundings signals and/or other surroundings signals compared to the primary motion planning 503.

Based on the surroundings signals, the secondary motion planning 505 provides for an surroundings model to be created that represents the surroundings of the motor vehicle.

It is further provided that the desired control, which is output by the algorithm 509, is also transmitted to the secondary motion planning 505. Based on the desired control 517, a state of the motor vehicle is predicted according to a function block 521.

For the purposes of this description, a condition of the motor vehicle generally comprises, for example, the following: position, and/or speed, and/or deceleration, and/or acceleration.

It is further provided that a predefined limitation of the desired control 517 is additionally used for this prediction according to the function block 521.

The created surroundings model according to the functional block 519 is used to predict a prediction of the surroundings of the motor vehicle according to a functional block 523. In other words, the model predicts what the surroundings will look like in a predetermined future. A result of this prediction is transmitted on the one hand to a function block 525 and on the other hand to a function block 527.

In function block 525, based on the predicted state of the motor vehicle, the created surroundings model according to function block 519 and based on the predicted surroundings according to function block 523, it is determined whether the desired control 517 must be secured.

If this is the case, a safe trajectory for the vehicle is planned in accordance with function block 527. For example, the following are used for this planning: created surroundings model, predicted surroundings.

Based on the determined safety trajectory, control signals for at least partly automated control of transverse and/or longitudinal guidance of the motor vehicle are generated according to a function block 528 and output to the actuator system 507.

As already explained hereinabove, the desired control 517 is output to the actuator system 507 by the primary motion planning system 503, whereby the desired control 517 is limited, for example for comfort reasons, before it is implemented. This takes place in a function block 529 so that, e.g., only a maximum of certain longitudinal decelerations and/or certain steering angle changes are permitted. This limited desired control is then arbitrated according to a function block 531 with the control signals of the secondary motion planning 505. In other words, according to the function block 531, it is provided that it is checked whether corresponding control signals have been received from the secondary motion planning 505. A result of function block 525 is also made available to function block 531. The function block 531 can thus be used to determine whether or not the desired control 517 should be overridden by control signals from secondary motion planning 505. If the result according to the function block 525 indicates that a safeguarding of the desired control 517 is required, this is not performed, but rather the control signals of the secondary motion planning 505 are performed.

These are then used to control one or more actuators of the actuator system 507 according to a function block 533, so that the motor vehicle is guided at least partly automatically according to a function block 535.

Figure 6:
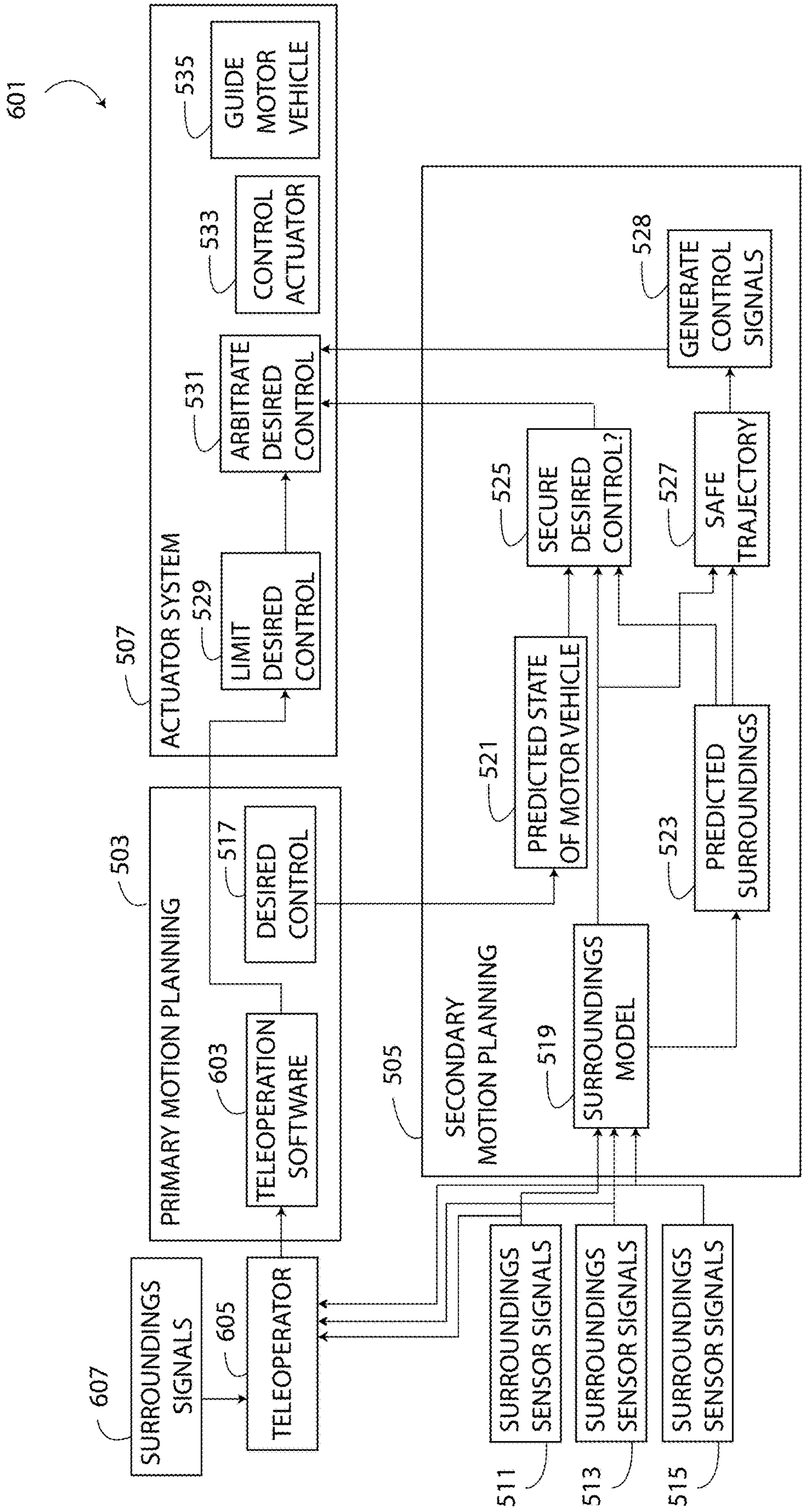

FIG. 6 shows a second block diagram 601.

The second block diagram 601 is essentially based on the first block diagram 501 according to FIG. 5. As a difference, it is provided that the desired control 517 is not generated by an algorithm 509. Rather, according to this block diagram 601, it is provided that a teleoperator 605 sends control instructions based on surroundings signals 607, for example camera images, to a teleoperation software 603, which generates the desired control 517 based thereon and outputs it to the actuator system 507.

It may be and is provided (and shown according to the block diagram 601 in FIG. 6) that the (examples of) surroundings signals 511, 513, 515 are also provided to the teleoperator 605 so that the latter can send one or more control instructions to the teleoperation software 603 on this basis.

Figure 7:
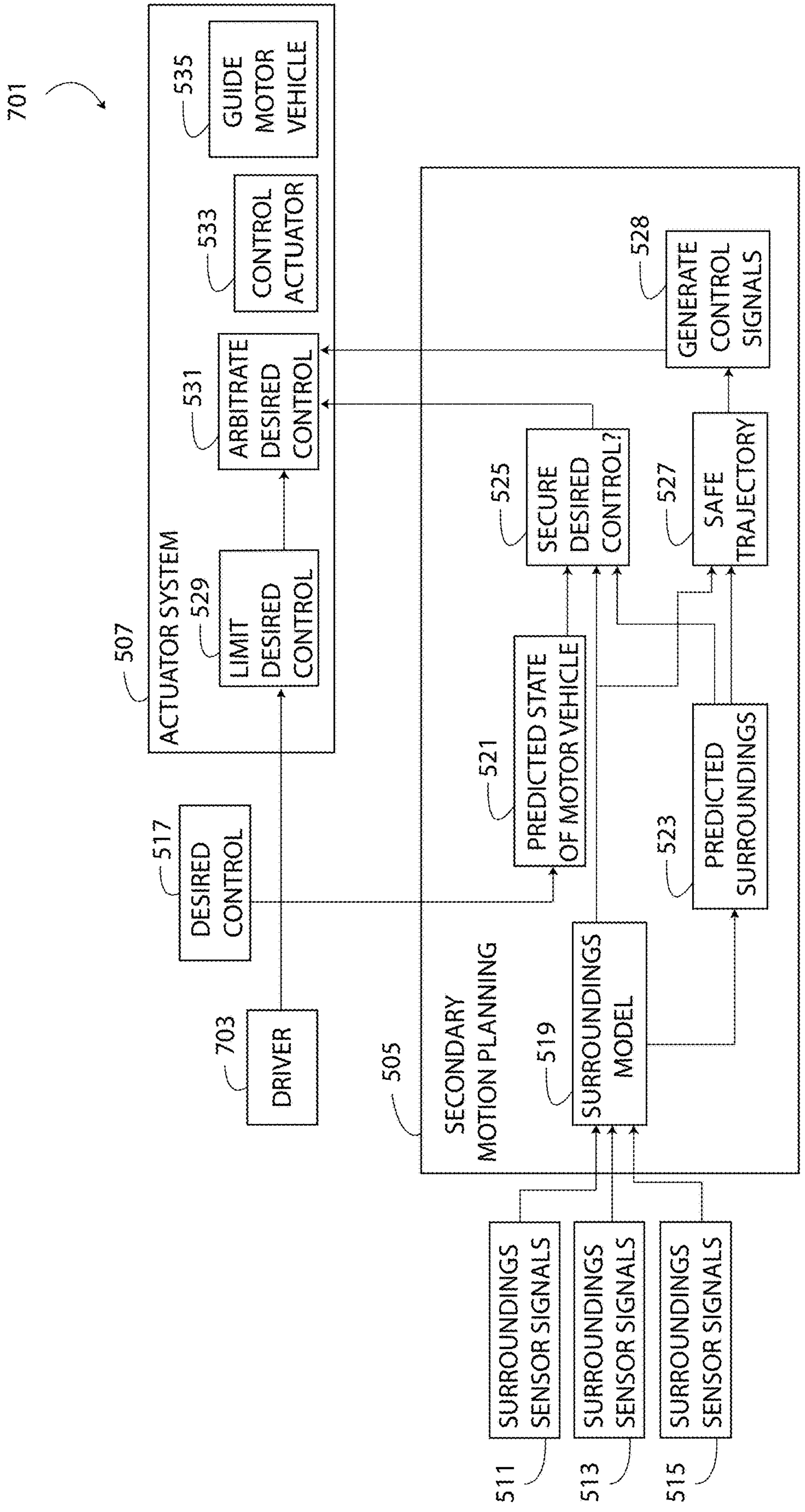

FIG. 7 shows a third block diagram 701, which is essentially based on the first block diagram 501.

One difference is that no algorithm 509 is used to generate the desired control 517. Rather, a driver 703 of the motor vehicle corresponds to the primary motion planning. The driver 703 thus manually generates a desired control 517 to control transverse and/or longitudinal guidance of the motor vehicle. This desired control 517 is, for example, a steering angle or an actuation of an accelerator pedal or an actuation of a brake pedal.

The concept described herein in particular enables maximum separation of the performance domain as primary motion planning and safety in secondary motion planning in an advantageous way. The primary motion planning can be performed by an automated driving algorithm, for example, but also by a human driver or, e.g., a teleoperator. The safeguarding is in each case performed by secondary motion planning.

The block diagrams shown in FIGS. 5 to 6 are examples of an architecture for decoupling the security and performance domains to explain the concept described herein. In the primary/performance level, algorithms run for at least partly automated driving and use the measurement data from surroundings sensors, map data, and other inputs such as vehicle sensors to determine a control variable vector U (desired control), which controls the vehicle in at least partly automated mode. This variable is, e.g., a target steering angle and/or a target longitudinal acceleration of the vehicle. U can, e.g., also comprise comparable target values.

The target values u for the control variable vector U, i.e. the vehicle request, are transmitted to the actuator system. For example, in order to ensure safe driving operation, the target values and/or, e.g., their changes (i.e., their first and further, e.g. second, derivatives) are limited, meaning that, e.g., only small longitudinal decelerations and small steering angle changes are permitted. Before the limited target values are sent to the actuator system, they are arbitrated with the result (Does the vehicle request have to be overridden, yes or no?) of the secondary motion planning (safety), whereby the target value (control signals) of the secondary motion planning always wins if it is active. Secondary motion planning therefore only takes control of the vehicle when necessary.

The secondary motion planning determines, e.g., a surroundings environment model from the measurement data of the surroundings sensors, the map and/or, e.g., other sensors. The surroundings sensor signals from the same surroundings sensors as for the primary motion planning can, e.g., be used for this purpose, but also, e.g., fewer and/or sensor signals from additional sensors. The surroundings model is, e.g., determined on the basis of algorithms developed to meet the requirements, for example according to the ASIL-D requirements (ASIL is the abbreviation for "automotive safety integrity level" in German).

The next step involves, e.g., predicting the surroundings model for the near future, e.g. using algorithms that have also been safely developed for this purpose. The safety level receives the target values u for the control variable vector U (motor vehicle request) determined by the primary motion planning. The possible states of the vehicle in the near future are, e.g., predicted using the known limitation of the target values u in the actuator system (the prediction horizon comprises a maximum of a few seconds, e.g. 10 s, e.g. 5 s, e.g. 3 s). For example, a robust control approach is used for this purpose, which takes into account a state estimation under uncertainties of the future manipulated variables and the models of the controlled system Limitation-Arbitration-Actuator System Control and Vehicle Control.

The robustly predicted vehicle states are, e.g., then evaluated in the context of the safely predicted surroundings model. If the current manipulated variables u are deemed to be sufficiently safe, no intervention of the secondary motion planning takes place. Otherwise, if there is, e.g., a risk of collision with a pedestrian or if there is a risk of leaving the road, the target values (control signals) for a safe trajectory are transmitted to the actuator system. Arbitration then ensures that the hazardous situation is avoided by implementing the target values for the secondary motion control.

The safe trajectory is determined, for example, in the secondary motion control in a planning step based on the safe surroundings model and the safe prediction. The target values for the actuator system are, e.g., subsequently determined by a vehicle motion controller.

In one embodiment, secondary motion planning is used to safeguard teleoperation. The teleoperator receives, e.g., sensor information from the vehicle, such as camera images. Additional sensor information can be made available to the teleoperator from the motor vehicle and/or from sensors installed in the surroundings of the motor vehicle. The teleoperator sends its control instructions to the vehicle, e.g. via mobile radio. In the vehicle, teleoperation software creates the control interventions u of the manipulated variable vector U in order to control the vehicle.

In one embodiment, secondary motion planning is used to safeguard the interventions of a human driver. The driver creates the control interventions u of the control variable vector U using, e.g., the accelerator pedal, brake pedal, and/or a steering torque.

The invention claimed is:

1. A method for at least partly automated guidance of a motor vehicle, the method comprising:

receiving desired control signals representative of a desired control for an actuator system of the motor vehicle for controlling a transverse and/or longitudinal guidance of the motor vehicle;

receiving surroundings signals representative of surroundings of the motor vehicle;

generating actuator control signals to be provided to the actuator system for the at least partly automated control of the transverse and/or the longitudinal guidance of the motor vehicle based on (i) the desired control signals, (ii) the surroundings signals, and (iii) a predefined limitation of the desired control; and controlling the motor vehicle using the actuator system based on the actuator control signals to move the motor vehicle for the at least partly automated guidance of the motor vehicle, wherein the actuator control signals override the desired control signals and are different from the desired control signals when required by the surrounding signals and the predefined limitation of the desired control, and wherein the actuator control signals correspond to the desired control signals when permitted by the surrounding signals and the predefined limitation of the desired control.

2. The method according to claim 1, further comprising:

predicting a risk state of the motor vehicle based on the desired control signals and the predefined limitation of the desired control; and generating the actuator control signals based on the risk state.

3. The method according to claim 2, further comprising:

predicting the surroundings of the motor vehicle; and generating the actuator control signals further based on the predicted surroundings.

4. The method according to claim 3, wherein:

the risk state of the motor vehicle is evaluated in a context of the predicted surroundings, and the actuator control signals are generated further based on the risk state.

5. The method according to claim 2, wherein:

the desired control signals are overridden and are different from the actuator control signals when required by the surrounding signals, the predefined limitation of the desired control, and the risk state, and the actuator control signals correspond to the desired control signals when permitted by the surrounding signals, the predefined limitation of the desired control, and the risk state.

6. The method according to claim 1, wherein:

the desired control comprises a desired manipulated variable vector for one or more actuators of the actuator system, and the predefined limitation comprises a limitation of the desired manipulated variable vector and/or a limitation of a temporal derivative.

7. The method according to claim 1, wherein the desired control comprises one or more of: desired control from a driver of the motor vehicle, desired control from an algorithm for the at least partly automated guidance of the motor vehicle, and desired control from teleoperation software for implementing control instructions from a teleoperator of the motor vehicle.

8. A device configured to perform the method according to claim 1.

9. A system for the at least partly automated guidance of a motor vehicle, comprising:

the device according to claim 8, wherein the device is configured to limit the desired control and to control one or more actuators based on the limited desired control, and wherein the device is configured to control the one or more actuators of the actuator system based on the actuator control signals and no longer based on the limited desired control.

10. The method according to claim 1, wherein a computer program comprises instructions which, when the computer program is executed by a computer, prompt the computer to perform the method.

11. A non-transitory machine-readable storage medium on which the computer program according to claim 10 is stored.

12. The method according to claim 1, wherein:

the desired control comprises a desired manipulated variable vector for one or more actuators of the actuator system, and the predefined limitation comprises a limitation of the desired manipulated variable vector and/or a limitation of a first and/or a second temporal derivative of the desired manipulated variable vector.

13. The method according to claim 1, wherein:

the desired control signals are generated by a primary motion planning system of the motor vehicle, the actuator control signals are generated by a secondary motion planning system of the motor vehicle, and the secondary motion planning system is configured to safeguard the primary motion planning system.

14. The method according to claim 1, wherein:

a surroundings model representing the surroundings of the motor vehicle is created based on the surroundings signals, and the actuator control signals are generated based on the surroundings model.

* * * * *